Patented Feb. 6, 1945

2,369,111

UNITED STATES PATENT OFFICE 2,369,111

BLOOD CLOTTING ACCELERATOR

Ivan A. Parfentjev, Nanuet, N. Y., assignor to Lederle Laboratories, Inc., New York, N. Y., a corporation of Delaware No Drawing. Application July 25, 1942, Serial No. 452,321

14 Claims. (Cl. 260—112)

This invention relates to globulin fractions of plasma possessing strong clotting properties, and to methods of obtaining such fractions.

This application is a continuation-in-part of my application Serial No. 390,911, filed April 29, 1941.

I have found that a portion of plasma possessing strong clotting properties may be separated out by fractional precipitation of the plasma with varying concentrations of ammonium sulfate. More specifically, the clotting fraction is that portion of plasma which is unprecipitated in a concentration of about 20% ammonium sulfate but which is precipitated at a concentration of about 30% ammonium sulfate.

The invention may be illustrated by the following example, to the details of which, however, the invention is not limited.

Example (a) Rabbit blood from immune or normal animals is bled into an equal volume of citrate solution in the usual manner. Cells are removed from the plasma by centrifuging. To the diluted and centrifuged plasma is added 200 grams of crystallized ammonium sulfate for each liter of diluted plasma to give about a 20% concentration of ammonium sulfate. There is formed a fluocculent precipitate which is allowed to settle and the supernatant liquid is decanted off and saved.

(b) The precipitate from step (a) after decantation is collected and redissolved in water in an amount equal to about one-half the total volume of the batch in (a). To this solution is added ammonium sulfate crystals in an amount sufficient to constitute about a 20% solution. A precipitate is again formed and after settling, the supernatant liquid is decanted off and saved.

(c) The procedure of step (b) is repeated.

(d) The supernatant liquids collected from steps (a), (b), and (c) are mixed, and there is added sufficient additional crystalline ammonium sulfate to give a concentration of about 30%. The precipitate formed is allowed to settle and the supernatant liquid removed by decantation or the like.

(e) The precipitate from step (d) is dissolved in water and sufficient ammonium sulfate is added to give about a 30% solution. A precipitate is again formed and after settling is separated from the liquid.

(f) The precipitate from step (e) is dissolved and reprecipitated in the same manner as described in step (e) with respect to the precipitate from step (d).

In each of the steps (a) to (f), inclusive, the solution is preferably adjusted to about pH 7.4 by addition of sodium hydroxide or the like, using phenol red as the indicator. In steps (a) to (c), inclusive, the solutions are preferably maintained at a temperature of about 37° C. and are kept agitated with a mechanical stirrer or the like. While improved yields are obtained by these modifications, they are not essential.

(g) The precipitate from step (f) is collected, dissolved in a small amount of water and the solution is placed in cellophane bags or envelopes and dialyzed in running water until all ammonium sulfate is removed. The dialyzed solution is adjusted by dilution to about 10% solids and contains the desired globulin fraction having strong clotting properties.

The clotting power of the last-named solution obtained as in step (g) may be demonstrated by adding 0.1 cc. of this solution to 0.9 cc. of normal horse plasma containing 0.25% potassium oxalate in a Wassermann tube. The tube is placed in a water bath at 37° C. and the clotting time is recorded. In such a test the plasma is clotted within thirty seconds. When a similar test is performed with 1:100 dilutions of this clotting globulin solution, clotting of the oxalated horse plasma takes place within thirty minutes or less. This property of clotting plasma has also been observed with plasma treated by numerous other substances generally used to prevent clotting, such as heparin, citrate, germanin, etc.

If desired, the clotting globulin solution as obtained from the cellophane bags after dialysis, as in step (g), may be adjusted to pH 5.3 (glass electrode) with 1/N lactic acid or other suitable relatively weak acids. After the pH is adjusted, the solution is diluted with distilled water in an amount sufficient to give maximum precipitation. The amount of dilution is separately determined by placing several 1 cc. samples of the undiluted solution in several test tubes and adding to them varying amounts of water. That relative proportion of water which gives maximum precipitation with the sample is used as a measure for dilution of the main batch of dialyzed solution. The diluted solution is permitted to stand at about 5° C. for about 16 to 18 hours. The supernatant liquid is decanted and saved and if reconcentrated to about 12% solids, is found to have substantially the same clotting power as the original material before the water-insoluble fraction was removed. The precipitate remaining after decantation is dissolved in 1/10% salt solution in an amount so that the solution contains approximately 5% to 6% proteins. This solution will be found to have its clotting properties increased considerably over the original clotting globulin solution. Further purification may be carried out by again adjusting the solution to pH 5.3 with lactic acid as before and allowing the precipitate to settle. The supernatant liquid is decanted from the settled precipitate, and this liquid is relatively even more potent in clotting power than the previous solutions. The precipitate may be redissolved to give a solution also having a high degree of clotting potency but this clotting globulin is not entirely free from other substances and contains some lipoids and coloring matter.

The desired globulin fraction can also be precipitated from its aqueous solutions by the addition of suitable amounts of acetone. As illustrative, the dialyzed solution from step ($g$) may be used as a suitable source and to this solution is added sufficient acetone to precipitate the globulin fraction. The acetone precipitate is removed from the liquid, as by filtration, and may be washed with acetone-ether mixtures, followed by a final washing with ether. By evaporating the ether from the precipitate, a dry powder is obtained which can be used directly as a hemostatic agent or which can be made up in solutions of other materials such as are commercially used for burns. The dry powder is easily dissolved in saline solutions. These various solutions will have the full potency of the solutions from which the powder was made since the precipitation and drying do not, in any way, affect the original potency of the globulin fraction.

These clotting globulins can also be obtained in the form of a powder by drying the solutions or precipitates under vacuum or by any other suitable means. The vacuum drying of the solutions in the frozen state is an especially convenient method. If desired, the dried material may be ground. The dialyzed solution from step ($g$), for example, may be used as the source of the dry powder. This powder will clot blood when added directly or it can be redissolved in water and the solution can then be added to blood or plasma. The drying process does not cause any appreciable loss of potency from a clotting standpoint. The dried materials as well as the solutions are relatively stable if not subjected to extreme physical or chemical conditions.

Instead of starting with rabbit blood or plasma, as specifically described, there may be used blood of equine, swine, canine, feline, bovine or human origin. The clotting globulin fractions obtained from these sources have the same desirable clotting characteristics as the rabbit plasma fraction and may be used in the same manner and with substantially the same effect.

A further unique property of the products of this invention is that they will clot plasma deprived of its own clotting mechanism by adsorption of the plasma with magnesium hydroxide. Such adsorbed plasma will not clot on recalcification but will clot readily by the addition of the present clotting globulin with or without the addition of calcium.

Any form of the above-described clotting globulins in either solution or dried form can be applied to bleeding wounds of men and animals with resulting immediate clot formation and no harmful effect on the tissues to which it is applied. This has been observed in heparinized animals as well as in normal ones, and the clotting of human blood has been observed even in such extreme conditions as hemophilia. It has been found that the specific globulin fraction separated by the present invention will instigate clotting in any form of whole blood or plasma, and this has been demonstrated in plasma treated by the known substances normally used to inhibit clot formation. So long as the blood or plasma contains fibrinogen which can be converted to fibrin, the present clotting globulins will bring about clot formation.

In place of the ammonium sulfate described in the specific example, other salts may be used as a means of fractionally precipitating the desired globulin and separating it from the other substances with which it is associated in the plasma. Among such salts may be mentioned sodium sulfate, sodium chloride, sodium phosphate and the like. In each case, suitable concentration of salts are used. By means of repeated precipitation and solution, the desired fraction is obtained in pure form. Other methods may also be used for isolating the globulin fraction of the plasma, which fraction has the strong clotting properties. It has been found that the re-addition of small amounts of other fractions of the plasma to the clotting globulin fraction will, in some cases, inhibit the blood clotting properties of the clotting fraction.

Other suitable changes and variations may be adopted for carrying out the invention as described in the appended claims.

I claim:

1. A process of preparing a blood clotting composition which comprises adding to plasma an amount of ammonium sulfate sufficient to give about a 20% solution of said sulfate and thereby forming a precipitate, separating the precipitate from the liquid, adding sufficient additional ammonium sulfate to the liquid to give about 30% concentration of ammonium sulfate, allowing a precipitate to form, separating the precipitate formed, redissolving said last-named precipitate and removing ammonium sulfate from said last-named solution.

2. A process of preparing a blood clotting composition which comprises adding to plasma an amount of ammonium sulfate sufficient to give about a 20% solution of said sulfate and thereby forming a precipitate, separating the precipitate from the liquid, adding sufficient additional ammonium sulfate to the liquid to give about 30% concentration of ammonium sulfate, allowing a precipitate to form, dissolving the precipitate formed in a small amount of water and dialyzing the solution formed until it is substantially free of ammonium sulfate.

3. The process of claim 2 in which the fractional precipitations at 20% and 30% concentrations of ammonium sulfate, respectively, are repeated in order to obtain a globulin fraction of a relatively high degree of purity and substantially free from clotting inhibiting fractions.

4. The process of claim 1 in which the solutions to be precipitated are adjusted to about pH 7.4.

5. A process of preparing a blood clotting composition which comprises adding to plasma an amount of ammonium sulfate sufficient to give about a 20% solution of said sulfate and thereby forming a precipitate, separating the precipitate from the liquid, saving the liquid for further treatment, redissolving the precipitate in water and adding sufficient ammonium sulfate to give about a 20% solution and thereby again forming a precipitate, separating the precipitate from the liquid, adding the last-named liquid to the previous liquid, repeating the solution of the precipitate and reprecipitation with the addition of the liquid so obtained to the previous liquids, adding sufficient ammonium sulfate to the combined liquids to give about 30% concentration of ammonium sulfate, allowing a precipitate to form, separating the precipitate formed, redissolving said last-named precipitate, adding sufficient ammonium sulfate to the solution so formed to give about 30% concentration of ammonium sulfate, allowing a precipitate to form, separating the precipitate formed, redissolving said last-named precipitate, again precipitating from about 30% ammonium sulfate solution, redissolving the precipitate so formed and removing ammonium sulfate from said last-named solution.

6. A plasma fraction having the property of converting fibrinogen to fibrin and thus instigating clotting in blood comprising a water-soluble globulin material being soluble in about 20% ammonium sulfate solution but being insoluble in about 30% ammonium sulfate solution, said composition being substantially free of plasma fractions and other substances which normally inhibit the blood clotting process and free from other plasma substituents which are soluble in 30% ammonium sulfate solution and insoluble in 20% ammonium sulfate solution.

7. A blood clotting composition comprising a globulin material obtained from that fraction of rabbit plasma which is soluble in about 20% ammonium sulfate solution but which is insoluble in about 30% ammonium sulfate solution, said material being substantially free from substances which inhibit clotting.

8. A blood clotting composition comprising a globulin material obtained from that fraction of rabbit plasma substantially free from fractions of rabbit plasma which normally inhibit the process of clotting blood, said globulin material being soluble in about 20% ammonium sulfate solution but being insoluble in about 30% ammonium sulfate solution, the composition having the property of converting fibrinogen to fibrin and thus instigating clotting in blood.

9. A blood clotting composition which is substantially free from ammonium sulfate and blood clotting inhibitors, and which comprises a globulin material obtained from that fraction of rabbit plasma which is soluble in about 20% ammonium sulfate solution but which is insoluble in about 30% ammonium sulfate solution.

10. A process of preparing a blood clotting composition which comprises adding to rabbit plasma an amount of ammonium sulfate sufficient to give about a 20% solution of said sulfate and thereby forming a precipitate, separating the precipitate from the liquid, adding sufficient additional ammonium sulfate to the liquid to give about 30% concentration of ammonium sulfate, allowing a precipitate to form, separating the precipitate formed, redissolving said last-named precipitate and removing ammonium sulfate from said last-named solution.

11. A process of preparing a blood clotting composition which comprises adding to rabbit plasma an amount of ammonium sulfate sufficient to give about a 20% solution of said sulfate and thereby forming a precipitate, separating the precipitate from the liquid, adding sufficient additional ammonium sulfate to the liquid to give about 30% concentration of ammonium sulfate, allowing a precipitate to form, dissolving the precipitate formed in a small amount of water and dialyzing the solution formed until it is substantially free of ammonium sulfate.

12. The process of claim 11 in which the fractional precipitations at 20% and 30% concentrations of ammonium sulfate respectively are repeated several times in order to obtain a globulin fraction of a relatively high degree of purity and substantially free from clotting inhibiting fractions.

13. The process of claim 10 in which the solutions to be precipitated are adjusted to about pH 7.4.

14. A process of preparing a blood clotting composition which comprises adding to rabbit plasma an amount of ammonium sulfate sufficient to give about a 20% solution of said sulfate and thereby forming a precipitate, separating the precipitate from the liquid, saving the liquid for further treatment, redissolving the precipitate in water and adding sufficient ammonium sulfate to give about a 20% solution and thereby again forming a precipitate, separating the precipitate from the liquid, adding the last-named liquid to the previous liquid, repeating the solution of the precipitate and reprecipitation with the addition of the liquid so obtained to the previous liquids, adding sufficient ammonium sulfate to the combined liquids to give about 30% concentration of ammonium sulfate, allowing a precipitate to form, separating the precipitate formed, redissolving said last-named precipitate, adding sufficient ammonium sulfate to the solution so formed to give about 30% concentration of ammonium sulfate, allowing a precipitate to form, separating the precipitate formed, redissolving said last-named precipitate, again precipitating with about 30% ammonium sulfate solution, redissolving the precipitate so formed and removing ammonium sulfate from said last-named solution.

IVAN A. PARFENTJEV.